United States Patent
Corazza et al.

(10) Patent No.: US 10,981,821 B2
(45) Date of Patent: Apr. 20, 2021

(54) ENVIRONMENTALLY SUSTAINABLE CEMENT COMPOSITION, ITS USE FOR INERTING DREDGING SEDIMENTS/SLUDGES, RELATIVE METHOD AND APPARATUS FOR INERTING

(71) Applicants: ITALCEMENTI S.P.A., Bergamo (IT); TICASS S.C.R.L. TECNOLOGIE INNOVATIVE PER IL CONTROLLO AMBIENTALE E LO SVILUPPO SOSTENIBILE, Genoa (IT); UNIVERSITA' DEGLI STUDI DI GENOVA, Genoa (IT)

(72) Inventors: Fabio Corazza, Gorle (IT); Sara Cepolina, Genoa (IT); Maurizio Di Dio, Mignanego (IT); Gerardo Capannelli, Genoa (IT); Antonio Comite, Genoa (IT); Gustavo Capannelli, Genoa (IT)

(*) Notice: Subject to any disclaimer, the term of this patent is extended or adjusted under 35 U.S.C. 154(b) by 21 days.

(21) Appl. No.: 15/551,258

(22) PCT Filed: Feb. 16, 2016

(86) PCT No.: PCT/IB2016/050814
§ 371 (c)(1),
(2) Date: Aug. 15, 2017

(87) PCT Pub. No.: WO2016/132286
PCT Pub. Date: Aug. 25, 2016

(65) Prior Publication Data
US 2018/0050946 A1    Feb. 22, 2018

(30) Foreign Application Priority Data
Feb. 17, 2015   (IT) .......................... MI2015A000222

(51) Int. Cl.
*C02F 11/14*     (2019.01)
*C04B 22/10*     (2006.01)
(Continued)

(52) U.S. Cl.
CPC ............ *C02F 11/14* (2013.01); *B09B 3/0041* (2013.01); *C02F 11/004* (2013.01);
(Continued)

(58) Field of Classification Search
None
See application file for complete search history.

(56) References Cited

U.S. PATENT DOCUMENTS

| | | |
|---|---|---|
| 4,652,180 A | 3/1987 | Jenkins, Jr. |
| 5,127,765 A * | 7/1992 | Millgard .................. B09C 1/00 405/128.45 |

(Continued)

FOREIGN PATENT DOCUMENTS

| | | |
|---|---|---|
| EP | 2334614 A1 | 6/2017 |
| JP | S63122816 A | 5/1988 |
| JP | 2004298659 A | 10/2004 |

OTHER PUBLICATIONS

Peysson S. et al: "Imobilization of heavy metals by calcium sulfoaluminate cement", Cement and Concrete Research, Pergamon Press, Elmsford, NY, US, vol. 35, No. 12, Dec. 1, 2005 (Dec. 1, 2005), pp. 2261-2270.

(Continued)

*Primary Examiner* — Clare M Perrin
(74) *Attorney, Agent, or Firm* — Florek & Endres PLLC

(57) ABSTRACT

A cement composition based on a sulfoaluminate clinker is described, together with its use for agglomerating and inerting sediment/dredging sludge, and the relative inerting method and apparatus.

8 Claims, 2 Drawing Sheets

(51) Int. Cl.
*C04B 22/14* (2006.01)
*B09B 3/00* (2006.01)
*C04B 28/06* (2006.01)
*C02F 11/00* (2006.01)
*C04B 111/00* (2006.01)
*C04B 103/10* (2006.01)
*C02F 101/20* (2006.01)
*C02F 101/22* (2006.01)
*C02F 101/30* (2006.01)
*C02F 101/32* (2006.01)
*C02F 101/36* (2006.01)

(52) U.S. Cl.
CPC ............ *C02F 11/008* (2013.01); *C04B 22/10* (2013.01); *C04B 22/149* (2013.01); *C04B 28/065* (2013.01); *C02F 2101/20* (2013.01); *C02F 2101/22* (2013.01); *C02F 2101/306* (2013.01); *C02F 2101/327* (2013.01); *C02F 2101/363* (2013.01); *C02F 2101/366* (2013.01); *C02F 2209/001* (2013.01); *C02F 2209/003* (2013.01); *C02F 2209/11* (2013.01); *C04B 2103/10* (2013.01); *C04B 2111/00784* (2013.01); *Y02W 30/91* (2015.05)

(56) References Cited

U.S. PATENT DOCUMENTS

| | | | | |
|---|---|---|---|---|
| 5,397,478 A | * | 3/1995 | Pal | ............................ B09C 1/08 |
| | | | | 210/710 |
| 5,656,174 A | * | 8/1997 | Hodges | .................. B01D 29/01 |
| | | | | 210/705 |
| 2006/0177590 A1 | * | 8/2006 | Abbott | .................. B05B 12/004 |
| | | | | 427/421.1 |
| 2011/0185950 A1 | * | 8/2011 | Cassat | .................. C04B 18/021 |
| | | | | 106/694 |

OTHER PUBLICATIONS

Luz C A et al: "Use of sulfoaluminate cement and bottom ash in the solidification/ stabilization of galvanic sludge", Journal of Hazardous Materials, Elsevier, Amsterdam, NL, vol. 136, No. 3, Aug. 25, 2006, pp. 837-845.

Ali Maher et al: "Solidification/ Stabilization of Soft River Sediments Using Deep Soil Mixing", Oct. 1, 2005, pp. 12-15.

* cited by examiner

ENVIRONMENTALLY SUSTAINABLE CEMENT COMPOSITION, ITS USE FOR INERTING DREDGING SEDIMENTS/SLUDGES, RELATIVE METHOD AND APPARATUS FOR INERTING

The present invention relates to an environmentally sustainable cement composition, its use for inerting sediment/dredging sludge, a relative inerting method and apparatus.

The present invention falls within the field of activities relating to the maintenance and extension of port areas, and also in general to canals or navigation basins. One of the problems particularly felt in these sectors is in fact the progressive accumulation of sediment and debris, especially in low-replacement basins, which leads to a continuous decrease in navigable depths.

In many cases, the sediments that accumulate with time also contain categories of major toxic pollutants, such as heavy metals (arsenic, mercury, cadmium, lead, chromium, nickel, copper, vanadium, cobalt, barium, etc.), aromatic polycyclic hydrocarbons (APH) and other petroleum derivatives, polychlorobiphenyls, pesticides, dioxins. Furthermore, the particle-size of these sediments in various situations is extremely fine, less than a millimeter, with an average value often in the order of a few tens of microns, which makes their removal even more difficult.

The cover-up of port docks, basins and navigation canals is consequently an important economic, environmental and technical problem.

In order to overcome this problem, it is known and common practice to proceed with dredging operations, which however have various negative effects on both the environment, such as the dispersion of pollutants and an increase in the turbidity, and also of an economic nature, mainly linked to the disposal costs of the sediments/dredging sludge, once extracted.

Consequently, dredging operations in themselves already involve significant problems associated with the movement of the solids and finer fractions, which causes an uncontrolled and considerable increase in the turbidity with an increase in the concentrations of suspended material, leading to a wide dispersion of contaminants, a change in the quality of the sediment, with an increase in the chemical oxygen demand.

Under reducing conditions, the metals are present as hydroxides or insoluble sulfides and are scarcely bioavailable.

Furthermore, in the past, the disposal of dredged sediment or dredging sludge was often effected by dispersing the sediment in the open sea, believing that the dilution of not only the sediments but also of the pollutants would be sufficient for avoiding the negative effects of the same. The extremely heavy environmental impact suffered by the marine ecosystem was not taken into consideration.

After the London Convention on Dumping in 1972 (to which numerous countries, including Italy, adhered), the disposal of dredged material was regulated internationally and, for example, if heavy metals are present in significant concentrations, their disposal in the sea is absolutely no longer allowed and the recovery and disposal of dredged material on land is mandatory.

The disposal of sediments/dredging sludge in landfills also has specific restrictions, as they represent dangerous waste material. The landfilling of polluting substances from contaminated soil, among which also dredging sludge, is in fact subject to severe regulations (for example the directive 1999/31/CE of Apr. 26, 1999 and the decision nr.2003/33/CE of Dec. 19, 2002) and the landfilling is determined by the classification of the waste material in relation to the pollutants contained therein, which ranges from class I (dangerous waste) to class III (inert waste). As far as the management of dredging sludge is concerned, reference should be made to the specific regulations of the Member States.

In the case of landfilling, it is therefore particularly important to lower the pollution class of the waste material, reducing the rate of leachable pollutants present in the sludge/sediment, in order to reduce not only the environmental impact but also the landfilling costs.

It should also be taken into consideration that the characteristics of the different sediments/harbor sludge, which influence the dredging, depend on countless factors such as for example: the concentrations of the contaminants of interest (COC); the residence time of the layer of sediment with residues; the thickness of the sediment layer with residues; the variability of the COC; the mobility of the sediment/sludge.

If contaminating residues are present, various dredging steps are necessary for reaching the objectives: with the first steps, the mass is removed and the remediation is then completed with additional final steps. It is evident that more steps entail higher costs and increase the resuspension effect of the sediments; the release of contaminants in the water column is directly connected to the resuspension of the sediments; it also depends, however, on the removal of contaminants from the water body. An increase in the sedimentation rates leads to a reduction in the release of dissolved contaminants and consequently in the diffusion and short-term risks, even if, in some extreme cases, the control of the resuspension may not be sufficient for controlling the release of contaminants and the risks deriving therefrom. Losses of contaminants associated with dredging operations can take place in the particulate, in dissolved or volatile fractions, each characterized by a different transporting and absorption mode. The contaminants normally associated with sediments, in fact, tend to remain firmly bound to the fine-grain particles, which have low sedimentation rates and can remain suspended in the water column for hours or days. The particles of sediments in suspension and relative contaminants can therefore be transported from the dredging area into the surrounding environment by the currents. These dissolved contaminants can then interact with other solids and materials present outside the dredging area, undergo reactions, be dispersed or incorporated in the local ecosystem, finally creating new equilibriums.

Finally, the high fluidity of the dredged materials as such (with a water content of up to 95% by weight) makes both the moving and subsequent treatment of the same on the mainland, extremely complex.

Treatment methods of sediments/dredging sludge have therefore been found for converting dredged material, substantially liquid, into a more consistent material which can therefore be managed more easily.

A known treatment method envisages the use of quicklime (CaO) which reacts instantaneously and in an extremely exothermic way with the water present in the sediment/sludge, forming portlandite ($Ca(OH)_2$).

The treatment of a marine sediment with CaO at a concentration of about 20% allows sediments capable of being managed to be obtained in about two hours.

CaO, however, is a dangerous product as it becomes converted to $Ca(OH)_2$ with an extremely dangerous and highly exothermic process. It must therefore be transported and used with care and according to the REACH European regulation on chemical substances, it is classified as a dangerous substance that must be managed with special precautions. Even after this treatment, the sediment/sludge treated with lime must be sent to special landfills due to the presence of heavy metals in high concentrations.

Patent application EP 2334614 describes a treatment of sediment/sludge deriving from the dredging of sea or river water which comprises mixing said sediment/sludge with a treating composition, comprising a sulfoaluminate binder, a sulfate and a catalyst of the hydration reaction of the sulfoaluminate binder; a setting phase of said mixture that lasts from about 1 to 7 days until a compact solid product is obtained with a free water content lower than 20% by weight with respect to the total mixture, considerably reduced with respect to the initial free water content in the sediment/sludge; a fractionation phase of said compact solid product to be adopted for subsequent uses.

This method not only requires the withdrawal, transportation and processing of the sediment/dredging sludge on the mainland, but also has the disadvantage of particularly lengthy times for obtaining the compact solid product. Furthermore, port basins require areas available for the storage of the dredging sludge, where the large quantity of water released during the storage phase of the sediment/sludge is saturated with a quantity of soluble salts and inorganic and organic pollutants that are dispersed in the environment. Further highly disadvantageous aspects are:
- the dispersion of potentially polluting material during the withdrawal phase;
- environmental risks (spillage and contamination) linked to the moving and transfer of the same;
- environmental impact (atmospheric pollution) in relation to the high number of phases and means involved.

The necessity is therefore strongly felt for finding alternative solutions to "classical" dredging and the consequent disposal of sediments/dredging sludge as such or sediments/dredging sludge after treatment with the methods of the state of the art, above all considering the ever-increasing sensitivity with respect to the environment and consequently also the demand for finding new sustainable development models for ports and basins/navigable canals.

These new solutions must guarantee the removal and expulsion of sediments/dredging sludge under extremely low environmental impact and economically sustainable conditions with respect to the solutions represented by conventional dredging or the treatment described above.

The Applicants have surprisingly found a particular environmentally sustainable cement composition, whose use in the treatment of sediments/dredging sludge, in particular by applying a specific method and inerting apparatus, allows the problems previously indicated to be solved, without having the drawbacks of the solutions of the state of the art.

An object of the present invention therefore relates to an environmentally sustainable cement composition which comprises a sulfoaluminate clinker in a percentage ranging from 75 to 97.9% by weight, preferably from 89 to 94.5% by weight, with respect to the weight of the cement, ferrous sulfate ($FeSO_4 \cdot nH_2O$) in a percentage ranging from 2 to 20% by weight, preferably from 5 to 10% by weight, with respect to the weight of the cement, and an accelerating agent of the hydration reaction in a percentage ranging from 0.1 to 5% by weight, preferably from 0.5 to 2% by weight, with respect to the weight of the cement.

In the present description, the term "cement composition" refers to a material in powder form which, when mixed with water, forms a paste which hardens by hydration, and which, after hardening, retains its resistance and stability also under water.

The sulfoaluminate clinker present in the cement composition according to the present invention comprises $4CaO \cdot 3Al_2O_3 \cdot SO_3$ (also indicated as C4A3$) as main phase and $(CaO)_2SiO_2$ (also indicated as C2S) as secondary phase.

In the cement composition according to the present invention, the calcium sulfate ($CaSO_4 \cdot nH_2O$) normally present in cement compositions is completely substituted by ferrous sulfate ($FeSO_4 \cdot nH_2O$), indicated hereunder as FeSO4.

In the present description, the term "sulfoaluminate clinker" refers to any material resulting from the calcination, at a temperature ranging from 900° C. to 1450° C. (clinkerization temperature), of mixtures containing at least a lime source (for example limestones having a content of CaO ranging from 50% to 60% by weight), at least an alumina source (for example, bauxite, calcined aluminas or other manufacturing by-products containing alumina) and at least a sulfate source (Gypsum, chemical gypsum, natural or synthetic anhydrite, gypsum, sulfocalcium ash) In cement jargon, these primary compounds are often indicated using the abbreviation C for CaO, S for $SiO_2$, A for $Al_2O_3$, $ for $SO_3$ and H for $H_2O$.

The preferred sulfoaluminate clinker in the cement composition according to the present invention has a content of C4A3$ higher than 5% by weight with respect to the total weight of the clinker and a content of C2S lower than 75% by weight with respect to the total weight of the clinker.

The preferred sulfoaluminate clinker in the cement composition according to the present invention comprises from 40% to 80% by weight of C4A3$ and from 15% to 25% by weight of C2S, with respect to the total weight of the clinker. The even more preferred sulfoaluminate clinker in the cement composition according to the present invention comprises from 54% to 62% by weight of C4A3$ and from 18% to 22% by weight of C2S, with respect to the total weight of the clinker, the complement to 100 consisting of oxides/minor phases.

Examples of sulfoaluminate clinkers that can be used in the cement composition according to the present invention are described in patents/patent applications EP1781579, EP0812811, EP1306356, EP2640673, WO023728, U.S. Pat. No. 8,268,071 e EP1171398.

The cement composition according to the present invention comprises $FeSO_4$ in a percentage ranging from 2 to 20% by weight with respect to the weight of cement, preferably from 5 to 10% by weight with respect to the weight of cement.

The presence of $FeSO_4$ in the cement composition according to the present invention is particularly important as, very surprisingly, $FeSO_4$ contemporaneously exerts a setting/hardening regulating action, reacting with the C4A3$ phase of the sulfoaluminate clinker to form ettringite, a flocculating action and an abatement action of chromium (VI), these combined actions of $FeSO_4$ being completely unexpected and surprising in enormous volumes of water, such as those to be treated according to the present invention, and/or under the specific pH and high salinity conditions of seawater.

The accelerating agent of the hydration reaction allows the hydration reactions of the sulfoaluminate binder to be accelerated and is preferably a salt of an alkaline metal selected from carbonate, sulfate or nitrate, more preferably lithium or sodium carbonate and even more preferably lithium carbonate.

A particularly preferred cement composition comprises:
  a sulfoaluminate clinker comprising from 54% to 62% by weight of C4A3$ and from 18% to 22% by weight of C2S with respect to the total weight of the clinker, said sulfoaluminate clinker being present in a quantity ranging from 90 to 94% by weight with respect to the weight of cement;

$FeSO_4$ in a quantity ranging from 5 to 10% by weight with respect to the weight of cement;

$Li_2CO_3$ in a quantity ranging from 0.5 to 2% by weight with respect to the weight of cement.

The cement composition according to the present invention can also comprise a classical flocculating agent (organic or inorganic) to eliminate possible traces of suspended solids, which must be selected from compounds capable of operating under the specific pH and salinity conditions of seawater. Examples of classical flocculating agents, without being limited to these, are chlorides and hydroxychlorides of aluminium and iron, bentonite, polyacrylamides, modified amides, etc.

It is evident to skilled persons in the field that the use of smaller pozzolanic additions such as natural or calcined pozzolans, slag and fly ash or non-pozzolanic additions such as limestone, equally allow the expected results of the present invention to be obtained. Said possible additional components cannot however exceed 35% by weight with respect to the total weight of the cement composition.

When added to sediment/dredging sludge, a cement composition according to the present invention allows said sediment/dredging sludge to be very effectively inertized both in terms of inerting results and in terms of agglomeration and inerting rate.

A further object of the present invention therefore relates to the use of the cement composition according to the present invention for inerting sediment/dredging sludge, both in situ and ex situ.

Another object of the present invention relates to a method for inerting sediment/dredging sludge, which comprises the following phases:
  mixing the sediment/dredging sludge with a cement composition according to the present invention for a time ranging from 10 seconds to 5 minutes;
  sedimentation of the mixture thus obtained for a time ranging from 2 to 120 minutes;
  solidification of the sediment thus obtained for a time ranging from 1 to 24 hours.

The percentage of cement composition to be mixed with the sediment/dredging sludge depends on numerous factors, such as the particle-size of the sediment/sludge, the quantity of residues such as sand and/or grit present in the sediment/sludge.

The cement composition according to the present invention is mixed with the sediment/dredging sludge in a percentage ranging from 30 to 80% by weight with respect to the weight of the sediment/sludge, preferably from 40 to 60% by weight.

The sediment/dredging sludge normally contains a quantity of water ranging from about 25 to 95% by weight, with respect to the total weight of the suspension.

The method for inerting sediment/dredging sludge according to the present invention is particularly advantageous, as it is extremely versatile and, thanks to the particularly reduced times of all the phases, it can be carried out both in situ, ex situ, and in continuous.

It allows the extremely rapid and effective agglomeration and inerting of sediment/dredging sludge and possible contaminants present in the same, avoiding their dispersion in the environment.

In the present description and claims, the expression "bottom of a water basin" refers to any of a seabed, lake bottom, bottom of a river or other water course (such as a natural or artificial canal), or the bottom of a generic tank.

In a first embodiment, said method can be applied ex situ: the sediments are dredged and sucked/removed from the bottom of a water basin and are sent to a mixing/sedimentation chamber, possibly after filtration and sieving treatment to eliminate sand and stones. The cement composition is also sent to this chamber and is mixed with sludge for the times envisaged, the mixture thus obtained is left to deposit and is subsequently sent to a maturation tank.

The second embodiment of the method for inerting sediments according to the present invention is particularly advantageous and is carried out in situ, i.e. directly on the bottom of the water basin to be treated, from which the sediments are not removed for the subsequent treatment with the cement composition.

The whole process is therefore carried out underwater, and this solution has the further advantage that the water involved in the activity remains in the same environment and with the same characteristics, without undergoing any contamination: it cannot therefore be considered as being process water. The volumes of water to be moved outside the water basin are therefore null or in any case extremely reduced with a consequent further energy advantage.

The method according to the present invention is carried out in a system which puts the cement composition and sediments under stirring and in contact in a secure manner, effecting a confined heterophasic mixing.

Said second embodiment of the method therefore comprises the following preventive steps:
  covering at least a portion of the bottom of a water basin with a hollow structure open below for defining a confined mixing chamber containing sediments to be treated;
  introducing the cement composition into the mixing chamber; and
  stirring the fluid present in the mixing chamber to lift at least part of the sediments covered by the hollow structure.

The covering step of at least a portion of the bottom of the water basin with the hollow structure comprises allowing the open end of the hollow structure to penetrate the bottom of the water basin for at least a certain length, to define a closed mixing chamber.

The second embodiment of the method according to the invention preferably comprises the step of expelling the cement composition and sediment from the mixing chamber through an expulsion opening of said chamber, before the sedimentation and solidification steps take place.

Even more preferably, a step is envisaged of gradually advancing the hollow structure in an advance direction and expelling the material treated in the opposite direction with respect to the advance direction.

In this way, it is advantageously possible to operate in continuous, as the sedimentation and setting phase takes place outside the mixing chamber, typically on the bottom of the open water basin.

An alternative variant of the second embodiment of the method according to the invention comprises the step of removing the hollow structure from the portion of the bottom of the water basin once the sedimentation step has been substantially completed. This process is therefore discontinuous.

The solidified end-product, i.e. the sediment/dredging sludge, agglomerated and inertized, obtained with the method according to the present invention can be left directly on the bottom of the water basin: in this case, this is a remediation/inerting intervention in which the material is securely deposited on the bottom.

In all other cases, the solidified end-product, i.e. the sediment/dredging sludge, agglomerated and inertized, can be removed, brought to the surface and sent to a landfill as inert waste or recycled for use in concretes, piers, roadways, embankments, etc.

The inerting apparatus of sediment according to the invention comprises at least a hollow structure suitable for defining, with at least a portion of a bottom of a water basin, a confined mixing chamber, the hollow structure comprising at least an inlet opening for the introduction of a cement composition and at least a mixing element of the cement composition with sediment present in the portion of the bottom of the water basin defining the mixing chamber.

The hollow structure preferably has a parallelepiped conformation, preferably cubic.

This configuration has advantageously proved to be optimum for promoting the mixing between the sediment and the cement composition as it prevents the formation of eddies and vortices, which accelerate sedimentation without an effective preventive mixing.

The mixing element preferably comprises at least a vortex breaker.

This expedient advantageously opposes the formation of eddies and vortices in order to facilitate an optimum mixing.

The hollow structure preferably comprises at least an expulsion opening of the mixture composed of sediment and cement composition.

The hollow structure preferably comprises motorized forward advancing means.

A further object of the present invention relates to a plant for inerting sediment comprising at least a movable barge on which at least a tank of a cement composition is located, for feeding an apparatus for inerting sediment as described above. In this case, the tank of a cement composition is connected to an inlet opening of the structure, suitable for defining with at least a portion of the bottom of the water basin, a confined mixing chamber, wherein the structure comprises a mixing element of the cement composition with sediment present in the portion of the bottom of the water basin defining the mixing chamber.

The cement composition is preferably produced according to the present invention.

Further characteristics and advantages of the present invention will appear evident from the following detailed description of some of its preferred embodiments, referring to the enclosed drawings. The various characteristics in the single configurations can be combined with each other as desired according to the above description, should advantage be taken of the benefits specifically deriving from a particular combination.

In said drawings.

In the following description, for illustrating the figures, identical reference numbers are used for indicating construction elements having the same function.

Figure 1:
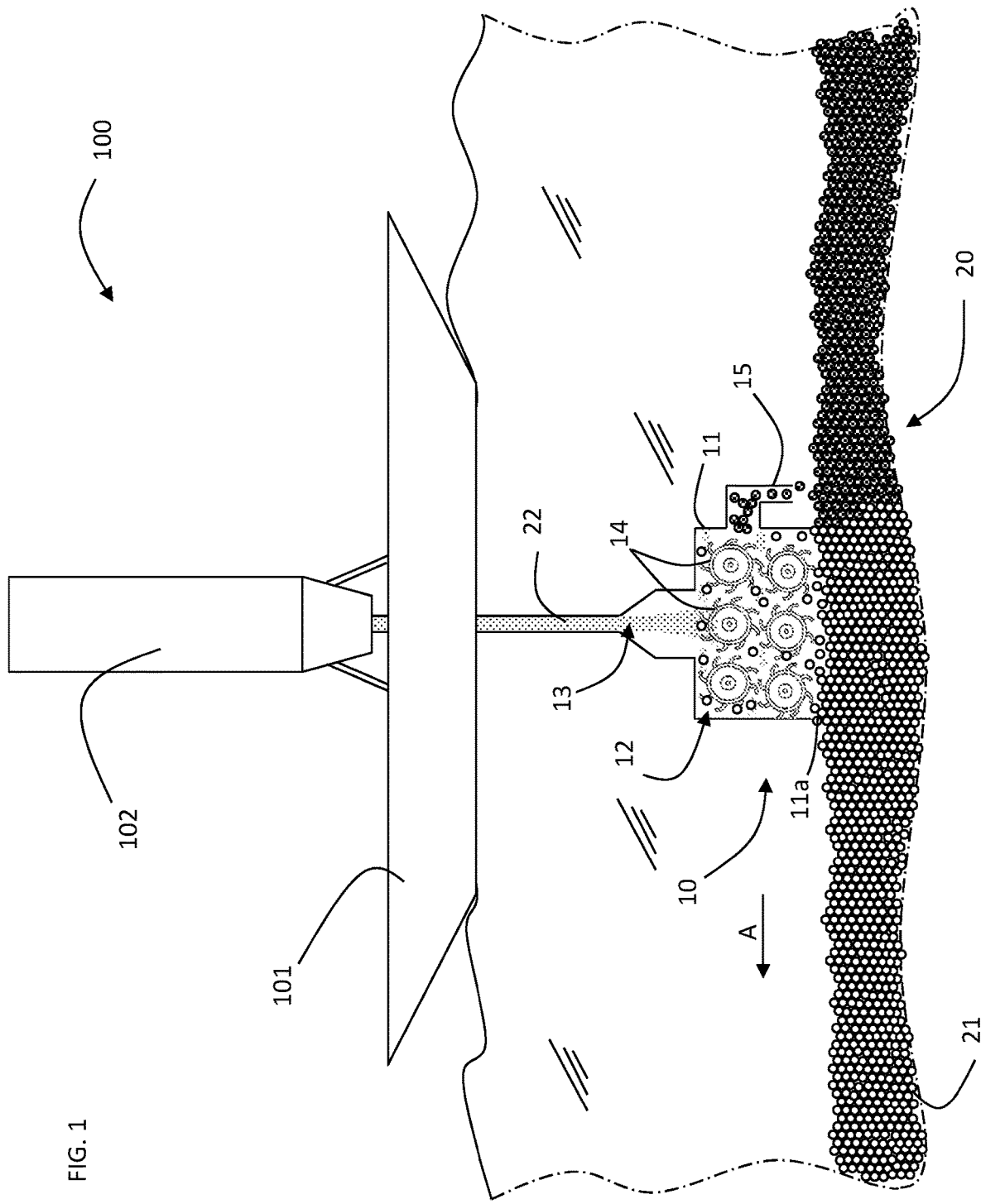
FIG. 1 is a schematic representation of a first embodiment of a sediment inerting plant according to the present invention.

With reference to FIG. 1, this shows a plant 100 for inerting sediment comprising a movable barge 101, in this case a dredger, on which a tank 102 of cement composition is positioned.

The tank 102 is connected to an inlet opening 13 of an inerting apparatus 10.

Said apparatus 10 comprises a hollow structure open below which, in the embodiment illustrated, is in the form of a bell-shaped body 11 having a cubic conformation which is positioned on the bottom 20 of a water basin for defining, with the portion of bottom 20 which it covers, a confined mixing chamber 12.

The hollow structure 11 comprises mixing elements 14 which, in the preferred embodiment illustrated, are produced in the form of blade cylinders.

The rotation of the cylinders 14 therefore causes a mixing of the cement composition 22 at the inlet with the sediments 21 present in the bottom portion 20 covered by the hollow structure 11.

The mixing elements 14 also envisage at least one vortex breaker (not illustrated).

The hollow structure 11 of the embodiment of FIG. 1 comprises an expulsion opening 15 of the mixture composed of sediment and cement composition.

In this way, it is possible to operate in continuous as the sedimentation phase takes place on the open bottom of the water basin after the mixture has been expelled from the mixing chamber.

Motorized forward advancing means of the inerting apparatus are also envisaged, which can also be of the automatic type. In this case, at least one turbidity sensor is envisaged, which provides a signal on the basis of which the motorized means are driven.

Figure 2:
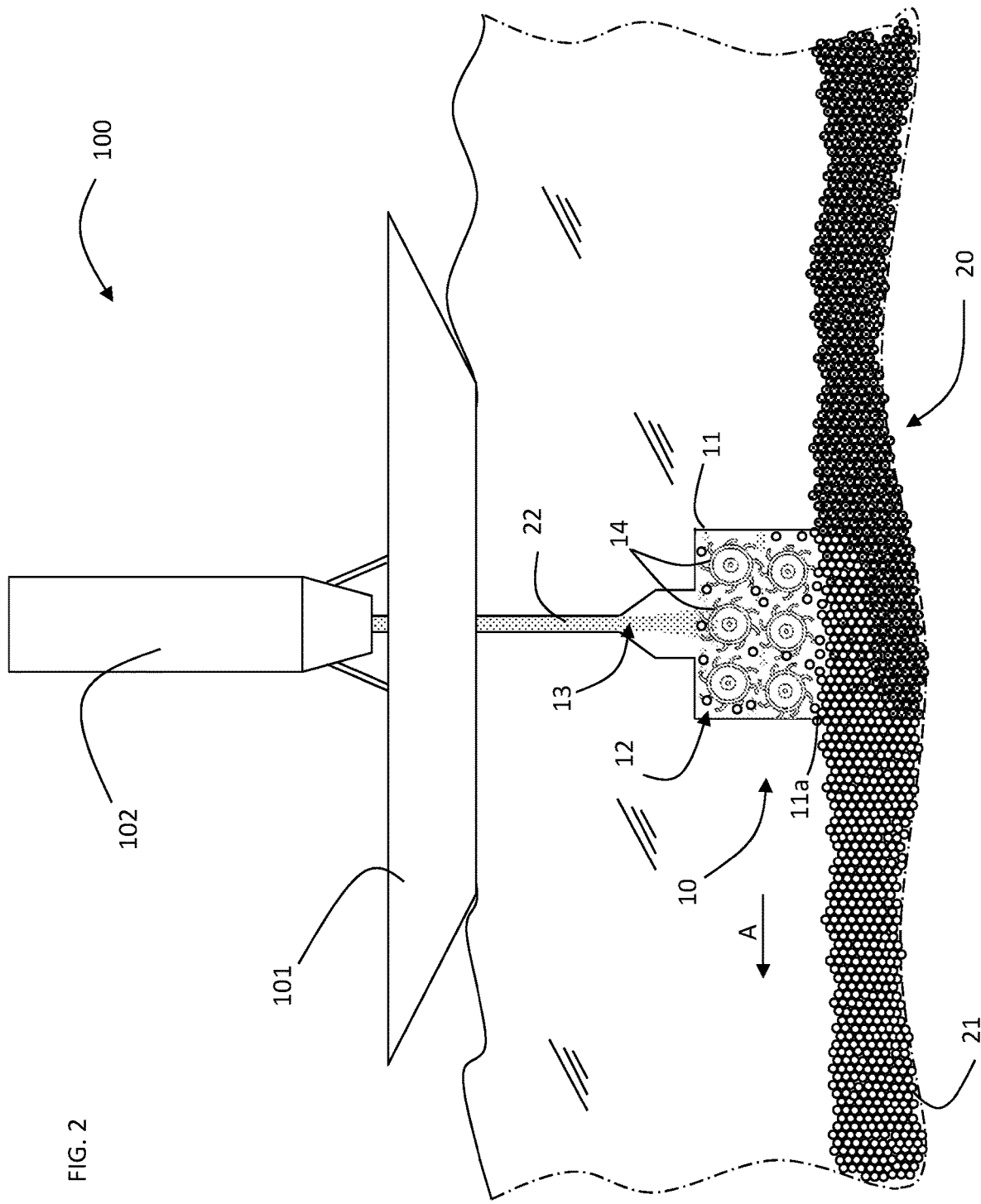
FIG. 2 is a schematic representation of a second embodiment of a sediment inerting plant according to the present invention.

FIG. 2 illustrates an embodiment variant of the inerting plant 100 of the present invention which differs from the embodiment of FIG. 1 in particular for the production of the inerting apparatus 10.

The inerting apparatus 10 illustrated in FIG. 2 has no expulsion openings as the sedimentation of the mixture of sediments and cement composition also takes place in the mixing chamber.

Once the sedimentation phase has been completed, the hollow structure 11 is removed from the treated portion of bottom 20, to be positioned in correspondence with a new portion of bottom 20 to be treated.

In particular, according to the present invention, the cement composition in the inerting plant is the composition previously described and exemplified hereunder.

The inerting method implemented by the plant of FIG. 1 is as follows.

At least a portion of a bottom 20 of a water basin is initially covered by the bell-shaped body 11 of the inerting apparatus 10 so as to define a confined mixing chamber 12 containing sediments 21 to be treated.

In particular, the open end 11a of the hollow structure 11 is caused to penetrate the bottom 20 for at least a length.

The cement composition is introduced into the mixing chamber 12, and contemporaneously, the fluid present in the mixing chamber 12 is stirred in order to lift at least part of the sediments 21 covered by the bell-shaped body 11.

There is therefore a mixing phase of sediments with the cement composition.

In the plant 100 of FIG. 1, the mixture is then expelled from the mixing chamber 12 so that the subsequent sedimentation and solidification phases take place outside the inerting apparatus 10, on the bottom 20 of the water basin.

The bell-shaped body 11 is caused to advance along a certain advance direction A, contemporaneously with the expulsion of the mixture from the mixing chamber 12.

Unlike the plant 100 of FIG. 1, the embodiment of FIG. 2 envisages that the sedimentation be carried out in the mixing chamber 12 and the bell-shaped body 11 is subsequently removed. Consequently only the complete solidification takes place outside the inerting apparatus 10.

Other characteristics and advantages of the invention will appear evident from the following illustrative and non-limiting examples.

The objective of the examples provided hereunder is to demonstrate the efficiency of cement compositions according to the present invention in the agglomeration and inerting of sediment/dredging sludge.

In particular, sediment/sludge and water were used with the characteristics indicated hereunder.

Harbour sludge, cement compositions and water were used in various combinations for each test, so that these example reflect, as closely as possible, the actual situation that exists on the bottom of the water basin to be treated.

The test marine sediments used in the following examples consist of sediment/sludge removed by pumping from the port of Genoa and are representative of various types of marine sediment/harbour sludge.

The sediment/sludge was characterized from the point of view of particle-size and chemical composition.

The particle-size of the sludge was evaluated wet by sieving on standardized net sieves with the characteristics indicated in Table 1.

TABLE 1

Standardized sieves used for sieving the sludge

| | ASTM - E11 (mesh) | Net span (μm) |
|---|---|---|
| Sieve 1 | 100 | 150 |
| Sieve 2 | 140 | 106 |
| Sieve 3 | 270 | 53 |

Table 2 hereunder indicates the particle-size distribution of the three examples of harbour sludge used in the experimental tests, object of the following examples.

TABLE 2

Particle-size distribution of the harbour sludge used

| Size | Sludge 1 Fraction, weight % | Sludge 2 Fraction, weight % | Sludge 3 Fraction, weight % |
|---|---|---|---|
| <50 μm | 29 | 38 | 36 |
| 50 μm-100 μm | 15 | 35 | 30 |
| 100 μm-150 μm | 7 | 19 | 12 |
| >150 μm | 49 | 8 | 22 |

The sediment consisted of a higher fraction (>150 μm) composed of sand and grit with an extremely heterogeneous particle-size, two fractions (with a particle-size ranging from 100 μm to 150 μm and from 50 μm to 100 μm) composed of fine and very fine sand and a lower fraction (<50 μm) corresponding to lime. The lower fraction is that which is mainly responsible for the turbidity of the water for considerable times during the dredging operations and moving of the sediment.

The sludge was analyzed to determine the main components and typical pollutants. Table 3 indicates the composition of the three examples of harbour sludge used in the experimental tests, object of the following examples.

TABLE 3

Main polluting components present in the harbour sludge used

| Contaminant Heavy metals | Sludge 1 Concentration (mg/Kg ss) | Sludge 2 Concentration (mg/Kg ss) | Sludge 3 Concentration (mg/Kg ss) |
|---|---|---|---|
| Al | 15888 | 25000 | 18000 |
| Fe | 30978 | 15000 | 7670 |
| Pb | 1125 | 227 | 212 |
| Cu | 1382 | 110 | 112 |
| Zn | 14473 | 363 | 372 |
| As | 20 | 10 | 6 |
| Cr | 75 | 450 | 100 |
| Cd | 15.8 | <1 | <1 |
| Hg | 3.9 | 1.4 | 2.8 |
| Ni | 34 | 45 | 55 |
| V | 27 | 54 | 44 |
| Organic carbon | 50300 | 31000 | 42500 |
| Light and heavy hydrocarbons | 3046 | 1200 | 1520 |
| Aromatic polycyclic hydrocarbons (IPA) | 0.158 | 1.621 | 2000 |
| Polychlorobiphenyls (PCB) | 1.54 | 0.110 | 0.120 | ss means dry solid

The sludge used in the following examples is under reducing conditions. In general, as previously indicated, a sludge can contain variable concentrations, also high, of numerous heavy metals with toxic characteristics (for example Cr, Cu, Pb), polluting organic compounds such as aromatic polycyclic hydrocarbons and polychlorobiphenyls, pesticides and dioxins.

In particular, the sludge pumped and used in the present examples contains a quantity of water equal to about 70% by weight.

Table 4 below indicates the composition of three samples of seawater used in the experimental tests, object of the following examples.

TABLE 4

Analysis of seawater

| Compound | Composition A (supernatant) sludge 1) | Composition B (supernatant) sludge 2) | Composition C (supernatant) sludge 3) |
|---|---|---|---|
| Chlorides (Cl$^-$) (mg/l) | 21.200 | 18.980 | 20800 |
| Sodium (Na$^+$) (mg/l) | 11.800 | 10.556 | 11900 |
| Sulfates (SO$_4^{2-}$) (mg/l) | 2.950 | 2.649 | 3060 |
| Magnesium (Mg$^{2+}$) (mg/l) | 1.403 | 1.262 | 1360 |
| Calcium (Ca$^{2+}$) (mg/l) | 423 | 400 | 355 |
| Potassium (K$^+$) (mg/l) | 463 | 380 | 663 |
| Bicarbonates (HCO$_3^-$) (mg/l) | — | 140 | 3 |
| Strontium (Sr$^{2+}$) (mg/l) | — | 13 | 7.69 |
| Bromides (Br$^-$) (mg/l) | 155 | 65 | <100 |
| Borates (BO$_3^{3-}$) (mg/l) | 72 | 26 | 18 |
| Fluorides (F$^-$) (mg/l) | — | 1 | 1 |
| Silicates (SiO$_3^{2-}$) (mg/l) | — | 1 | 1 |
| Iodide (I$^-$) (mg/l) | 2 | <1 | <1 |
| Total dissolved solids (mg/l) | 38600 | 34483 | 38040 |
| aluminium μg/l | <5 | <5 | <5 |
| arsenic μg/l | <1 | 4 | 4 |
| cadmium μg/l | <0.1 | <0.1 | <0.1 |
| chromium μg/l | <1 | 24000 | 176 |
| iron μg/l | <5 | <5 | <5 |
| copper μg/l | <1 | 3 | 3 |
| zinc μg/l | <1 | 3 | 3 |

TABLE 4-continued

Analysis of seawater

| Compound | Composition A (supernatant) sludge 1) | Composition B (supernatant) sludge 2) | Composition C (supernatant) sludge 3) |
|---|---|---|---|
| total hydrocarbons µg/l | <10 | <10 | 50 |
| aromatic polycyclic hydrocarbons µg/l | <0.01 | <0.01 | 35.6 |

The compositions described above refer to the analysis of the water pumped together with the sludge previously described.

As already mentioned, the objective of the examples provided hereunder is to demonstrate the efficiency of various cement compositions according to the present invention in the agglomeration and inerting of sediment/dredging sludge.

In particular, the sedimentation, clarification and setting steps were carried out and evaluated, using the following methods and equipment.

Jar Tester Apparatus

A jar tester is a commercially available apparatus (for example flocculators produced by Velp Scientifica (http://www.velp.com/it/prodotti/linea/2/famiglia/32/fl occulatori) or by Phipps and Bird (http://www.phippsbird.com/)) which allows the behaviour in sedimentation and clarification of water or a turbid product to be simultaneously compared, following the contemporaneous addition of various substances or the addition of the same substance in different quantities.

A jar tester is an instrument consisting of various mechanical stirrers that operate contemporaneously, and is widely used for simulating mixing, sedimentation and clarification conditions in water purification plants.

The apparatus consists of a plurality of transparent containers, all having the same dimension, in which the samples are introduced and mixed at the same adjustable rate for the times established for each experiment, by means of stirring/rotating blades all having the same dimensions, that can be regulated in height and velocity.

Clarification Evaluation

The clarification efficiency, i.e. the efficiency in abating the turbidity, was evaluated by means of absorbance measurements with a UV/Vis spectrophotometer according to the method APAT-IRSA-CNR 2110—Turbidity Ed. 2003. When the absorbance value was higher than 40 NTU, the sample was diluted, taking this into account in the expression of the result.

The abatement percentage of the turbidity at generic time t, following the addition of the cement, was calculated with respect to the turbidity of the sample of sediment at the same time t, as follows:

$$[\text{Turbidity abatement efficiency}] \% = \frac{(\text{Turbidity of sludge sample}) - (\text{Turbidity of treated sample})}{(\text{Turbidity of sludge sample})} \times 100$$

Setting evaluation with a Vicat-type apparatus

The apparatus used is analogous to that described in the reference standard UNI EN 196-3, consisting of a sliding rod that has, at the lower end, a needle or conical tip, on which one or two cylinders having a known mass (150 g) act.

Cement and water pastes were prepared for effecting the setting test, in a weight ratio of 1:2 and pastes of water, cement and sludge with a solid/water weight ratio of 1:2.

The pastes thus composed were positioned in small jars and placed under the sliding rod. At this point, the needle or tip was positioned so as to touch the upper surface of the paste and was left to descend under its own weight (150 g): the first measurement is effected when the needle or tip is on the surface of the paste and then the subsequent measurement when the needle or tip reaches the run-end with its own weight: the penetration is given by the delta between these two measurement data: the start of the setting is defined as the moment in which the needle or tip stops at 3 mm from the bottom and the end of the setting is the moment in which the needle penetrates the paste for not more than 0.5 mm.

In the following examples, this test allowed the setting efficiency of the cement compositions of the present invention described in the examples, to be evaluated.

The tests carried out with this apparatus directly under the treatment conditions described in the examples were effected with the following rods:
1) diameter 6 mm, weight 87 g;
2) diameter 3 mm, weight 6 g.

EXAMPLE 1

Preparation of the Cement Compositions.

The cement compositions indicated in Table 5 below were prepared:

TABLE 5

Cement compositions

| | Clinker | FeSO$_4$ (%) | LiCO$_3$ (%) | NaCO$_3$ (%) |
|---|---|---|---|---|
| Mixture 1 Invention | Alipre ® | 5 | 1 | — |
| Mixture 2 Invention | Alipre ® | 5 | 2 | — |
| Mixture 3 Comparison | Alipre ® | 5 | — | — |
| Mixture 4 Comparison | Alipre ® | — | — | — |
| Mixture 5 Comparison | Portland 52.5 R | — | — | — |
| Mixture 6 Invention | Alipre ® | 10 | 2 | — |
| Mixture 7 Invention | Alipre ® | 10 | — | 5 |

Clinker Alipre® is a commercial product having the following composition:
Chemical Constituents (% XRF Analysis)
CaO 42; SiO$_2$ 6; Al$_2$O$_3$ 32; Fe$_2$O$_3$ 1; SO$_3$ 14+minor oxides
Mineralogical Composition
C4A3$58%, C2S 20%+minor phases
The volume mass and average fineness of Alipre® are:
Blaine specific surface 4,500 cm$^2$/g;
Volume mass 2.8 g/cm$^3$.

EXAMPLE 2

Sedimented Volume/Abatement Efficiency, Setting Time 800 ml of seawater (Table 4, Composition A) were added to 90 g of sediment/harbour sludge (Tables 2 and 3, Sludge 1) in a beaker having a volume of 1 l. The sediment and seawater were mixed at a rate of about 200 rpm using the Jar Tester equipment described above.

100 g of each cement composition listed in Table 5 were then added to all the containers and the stirring was interrupted after about 1 minute.

Two containers were prepared for the comparative tests, the first containing only sludge 1 (90 g) and seawater (composition A, 800 ml) and the second containing sludge 1 (90 g), seawater (composition A, 800 ml) $FeSO_4$ (5 g) and $LiCO_3$ (2 g).

After about 15 minutes, the quality of the clarification was evaluated by measuring the turbidity of each sample, following the method indicated above. After about 30 minutes, the volume of the sediment was measured and after about 120 minutes the tendency to consolidate was measured with the Vicat-type equipment described above, with a rod weighing 85 g.

The maximum turbidity abatement that can be obtained is that in which the seawater overlying the sediment is under calm conditions and corresponds to 95%.

TABLE 6

| Sludge 1 + Water + | Sediment volume after 30 minutes, ml | Turbidity abatement efficiency after 15 minutes of sedimentation, % | Penetration depth (85 g) after 120 minutes, cm |
|---|---|---|---|
| Mixture 1 | 290 | 85 | 0.1 |
| Mixture 2 | 300 | 89 | 0.1 |
| Mixture 3 | 300 | 82 | Complete as far as the bottom of the container |
| Mixture 4 | 470 | 88 | Complete as far as the bottom of the container |
| Mixture 5 | 350 | 94 | Complete as far as the bottom of the container |
| Mixture 6 | 350 | 82 | 0.1 |
| Mixture 7 | 350 | 84 | 0.3 |
| $FeSO_4$ and $LiCO_3$ | Not observable | 51 | Complete as far as the bottom of the container |

The addition of the cement compositions according to the present invention allows an interface to be observed between solids that settle and clarified water and enables the assessment of the volume of the solid material that has settled on the bottom of the container with values ranging from 290 to 390 ml. If the values are higher, due to the dredging times and volumes involved, the process is considered to be ineffective.

In particular, as far as the clarification capacity of the cement compositions according to the present invention is concerned, the turbidity abatement data indicated in Table 6 show that the mixtures allow turbidity abatement values to be obtained, within 15 minutes, with values ranging from 80 to 94%.

The sole addition of ferrous sulfate and lithium carbonate to the sludge in concentrations comparable to those present in the cement mixtures according to the present invention, does not lead to a marked improvement in the sedimentation and clarification.

With respect to the setting capacity, it should be noted that not all the cement compositions tested are capable of starting the consolidation process in the presence of sludge and seawater. Mixture 1, Mixture 2 and Mixture 6 (cement compositions according to the present invention) were the only ones capable of consolidating so as to prevent the penetration of the rod of the penetrometer.

It can therefore be seen from the data that the best compromise in terms of final volume of sediment produced, quality of the clarified product and setting capacity is represented by Mixture 1, Mixture 2 and Mixture 6, said mixtures falling within the qualitative and quantitative ranges according to the claims of the present patent application.

EXAMPLE 3

Chromium Abatement Tests 800 ml of seawater having Composition B (Table 4) were added to 90 g of harbour sludge 2 (tables 2 and 3) in a beaker as described in Example 2. The sediment and seawater were mixed at a rate of about 200 rpm using the Jar Tester equipment described above.

100 g of each cement composition listed in Table 5, prepared according to Example 1 were then added to all the containers, and the stirring was interrupted after about 1 minute.

The concentration of chromium was then measured in the liquid overlying the volume of sediment, after 24 hours, and the chromium abatement efficiency was determined as follows:

$$[\text{Efficiency of chromium abatement}] \% = \frac{[\text{Starting chromium concentration}] - [\text{Chromium concentration after 24 hours}]}{[\text{Starting chromium concentration}]} \times 100$$

Obtaining the results indicated in Table 7

TABLE 7

| Chromium abatement | |
|---|---|
| | Chromium abatement efficiency in seawater 2, % |
| Mixture 1 | 99.5 |
| Mixture 2 | 99.5 |
| Mixture 3 | 81 |
| Mixture 4 | 0 |
| Mixture 5 | 0 |
| Mixture 6 | 99.5 |
| Mixture 7 | 99.5 |

It can be observed that Mixture 6 (containing Portland alone) does not allow the abatement of chromium in the seawater overlying the sediment consisting of sludge and the cement mixture. The best results were obtained with Mixture 1, Mixture 2 and Mixture 6 which allow chromium abatement efficiencies higher than 95%. The best behaviour was obtained with Mixture 1, Mixture 2 and Mixture 6.

On comparing the data obtained in the previous Example 2 with the data of the present Example 3, it can be seen that the presence of ferrous sulfate, supported by the presence of lithium carbonate, optimizes the capturing of the chromium precipitate in the structure of the sediment volume, completely removing it from the water.

EXAMPLE 4

Release Tests of Organic Contaminants

About 200 g of Mixture 1 were added, under stirring at 200 rpm, to 200 g of Sludge 1 with 2 l of seawater having composition A as supernatant. After about 1 minute, the stirring was interrupted to allow the sedimentation, clarification and setting as described in Example 2. A sample of clarified water was then collected to verify the presence of total Hydrocarbons, Aromatic Polycyclic Hydrocarbons (APH) and Polychlorobiphenyls (PCB). Table 8 summarizes the data obtained.

TABLE 8

Analysis of the release of organic contaminants on the part of the sludge after treatment with Mixture 1

| Contaminants | Analysis method | Concentration of contaminants after treatment with Mixture 1 |
|---|---|---|
| Total hydrocarbons | ISO 9377-2: 2002 | <10 µg/l |
| Aromatic polycyclic hydrocarbons | EPA 3510C 1996 + EPA 8270D 200 | benzo(a)anthracene benzo(b)fluoranthene chrysene indene(1,2,3-c,d)pyrene <0.01 µg/l benzo(a)pyrene benzo(g,h,i)perylene |

TABLE 8-continued

Analysis of the release of organic contaminants on the part of the sludge after treatment with Mixture 1

| Contaminants | Analysis method | Concentration of contaminants after treatment with Mixture 1 |
|---|---|---|
|  |  | dibenzo(a,h)anthracene total (31, 32, 33, 36) <0.001 µg/l benzo(k)fluoranthene pyrene <0.005 µg/l |
| Polychlorobiphenyls | EPA 3510C 1996 + EPA 8270D 2007 | Each PCB < 0.005 µg/l |

Starting from Sludge 1 with a content of about 3,050 mg/Kg ss of total Hydrocarbons, about 158 mg/Kg ss of Aromatic Polycyclic Hydrocarbons and 1.54 mg/Kg ss of Polychlorobiphenyls, the treatment with the cement compositions according to the present invention does not cause the rapid release into water of organic contaminants present in the sludge following the same treatment.

EXAMPLE 5

Capture Tests of Organic Contaminants

About 200 g of Mixture 1 were added, under stirring at 200 rpm, to 200 g of Sludge 3 with 2 l of seawater having composition C as supernatant. After about 1 minute, the stirring was interrupted to allow the sedimentation, clarification and setting as described in Example 2. Samples of clarified water were collected to verify the presence of Aromatic Polycyclic Hydrocarbons (APH) after 1 hour and after 24 hours (Table 10) (according to the method EPA 3510C 1996+EPA 8270D 2007).

TABLE 9

Analysis of the release of organic contaminants on the part of the sludge after treatment with Mixture 1

|  | APH concentration in sea water (composition C) before treatment with Mixture 1, µg/l | APH concentration in the clarified water 1 hour after treatment with Mixture 1, µg/l | APH concentration in the clarified water 24 hours after treatment with Mixture 1, µg/l |
|---|---|---|---|
| acenaphthene | <0.01 | <0.01 | <0.01 |
| acenaphthylene | 0.82 | 0.5 | 0.39 |
| anthracene | 0.83 | 0.65 | 0.33 |
| benzo(e)pyrene | 1.967 | 0.298 | 0.329 |
| benzo(j)fluoranthene | 1.029 | 0.155 | 0.255 |
| dibenzo(a,e)pyrene | 1.959 | 0.005 | 0.005 |
| phenanthrene | 2.4 | 2.25 | 0.91 |
| fluoranthene | 3.2 | 0.96 | 0.75 |
| fluorene | 0.33 | 0.24 | 0.25 |
| benzo(a)anthracene | 3.58 | 0.85 | 0.63 |
| benzo(a)pyrene | 2.821 | 0.413 | 0.454 |
| benzo(b)fluoranthene | 1.42 | 0.21 | 0.26 |
| benzo(k)fluoranthene | 1.485 | 0.217 | 0.268 |
| benzo(g,h,i)perylene | 1.486 | 0.184 | 0.242 |
| chrysene | 3 | 0.58 | 0.61 |
| dibenzo(a,h)anthracene | 0.643 | 0.001 | 0.073 |
| indeno(1,2,3-c,d)pyrene | 1.47 | 0.18 | 0.21 |
| pyrene | 2.17 | 0.589 | 0.476 |
| Total (31, 32, 33, 36) | 5.861 | 0.791 | 0.98 |

After treatment with Mixture 1, the organic contaminants initially present in the seawater were mostly removed from the water matrix with an overall removal efficiency from 75% after 1 hour to 80% after 24 hours.

EXAMPLE 6

Simulation of the Setting Process in a Tank Under Conditions Similar to Real Conditions.

A layer of sludge 1 having an overall height of 10 cm and seawater having composition A as supernatant for an overall height of about 1 m, are present on the bottom of a container having a volume of about 2.5 m³ with a base of about 1 m×2 m. The supernatant water was clarified before proceeding with the simulation.

Plastic pipes having the following diameters: 7 cm, 10 cm, 20 cm, were inserted on the bottom of the container, for almost the whole depth of the sludge, without moving the same.

A stirrer was inserted in each pipe for the mixing operation. The mixing conditions applied were the same as those described in Example 2. During the mixing phase, Mixture 2 was added to the pipes having different diameters, in the quantities indicated in Table 10, which approximately correspond to a sludge/cement ratio of 1/1. The mixing/stirring was maintained for about 2 minutes.

During the mixing operations inside the pipes, no turbidity phenomena of the sea water outside the pipes was observed. With reference to the setting capacity, the values found are in compliance with the data indicated in Example 2, again referring to Mixture 2.

After about 120 minutes, the plastic pipes were extracted so that their content remained inside the tank. No consistent turbidity phenomena were observed. When the pipes were extracted from the container, their content, remaining inside the tank, proved to consist of blocks having their own form and hardness, in the setting phase.

After about 24 hours the end-products, completely consolidated, were extracted from the tank and the turbidity phenomena were negligible.

TABLE 10

| Pipe diameter, cm | Quantity of Mixture 2, kg |
|---|---|
| 7 | 0.67 |
| 10 | 1.37 |
| 20 | 5.47 |

The invention claimed is:

1. A method for inerting sediment/dredging sludge, which comprises the following steps:
    sucking/removing sediment from a bottom of a water basin forming dredging sludge;
    feeding the dredging sludge to a mixing and sedimentation chamber;
    feeding a cement composition to the mixing and sedimentation chamber, the cement composition comprising a sulfoaluminate clinker in a percentage ranging from 75 to 97.9% by weight with respect to the weight of the cement, ferrous sulfate ($FeSO_4 nH_2O$) in a percentage ranging from 2 to 20% by weight with respect to the weight of the cement, and an accelerating agent of a hydration reaction in a percentage ranging from 0.1 to 5% by weight with respect to the weight of the cement, said accelerating agent of the hydration reaction being selected from the group consisting of alkaline metal carbonate, sulfate, or nitrate salts;
    mixing of the dredging sludge with the cement composition for a time ranging from 10 seconds to 5 minutes;
    sedimentation of the mixture thus obtained for a time ranging from 2 to 120 minutes;
    solidification of the sediment thus obtained for a time ranging from 1 to 24 hours;
    the entire method being carried out underwater.

2. The method for inerting sediment/dredging sludge according to claim 1, comprising the step of filtering and sieving the dredging sludge before feeding it to the mixing and sedimentation chamber.

3. The method for inerting sediment/dredging sludge according to claim 1, comprising the step of transferring the sedimented mixture to a maturation tank, before the solidification step.

4. The method for inerting sediment/dredging sludge according to claim 1, further comprising the following steps prior to the step of mixing:
    covering at least a portion of the bottom of a water basin with a hollow structure open below for defining the mixing and sedimentation chamber containing the sediment to be treated.

5. The method for inerting sediment/dredging sludge according to claim 4, wherein the step of covering at least a portion of the bottom of a water basin with the hollow structure comprises allowing the open end of the hollow structure to penetrate the bottom for at least a certain length.

6. The method for inerting sediment/dredging sludge according to claim 4, comprising the step of expelling the mixture of cement composition and sediment from the hollow structure through an expulsion opening of said hollow structure, before the sedimentation and solidification steps take place.

7. The method for inerting sediment/dredging sludge according to claim 6, comprising the step of gradually advancing the hollow structure in an advance direction and expelling the material treated in the opposite direction with respect to the advance direction.

8. The method for inerting sediment/dredging sludge according to claim 4, comprising the step of removing the hollow structure from the portion of the bottom once the sedimentation step has been completed.

* * * * *